US010839688B2

(12) United States Patent
Serrano et al.

(10) Patent No.: US 10,839,688 B2
(45) Date of Patent: Nov. 17, 2020

(54) APPLICATION-CONTROLLED GEO-BEAMFORMING

(71) Applicant: Bayerische Motoren Werke Aktiengesellschaft, Munich (DE)

(72) Inventors: David Gozalvez Serrano, Munich (DE); Adrian Posselt, Munich (DE); Sebastian Zimmermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/662,881

(22) Filed: Jul. 28, 2017

(65) Prior Publication Data

US 2017/0330462 A1 Nov. 16, 2017

Related U.S. Application Data

(63) Continuation of application No. PCT/EP2016/051505, filed on Jan. 26, 2016.

(30) Foreign Application Priority Data

Jan. 30, 2015 (DE) ........................ 10 2015 201 641

(51) Int. Cl.
*G08G 1/16* (2006.01)
*H04B 7/06* (2006.01)

(52) U.S. Cl.
CPC .............. *G08G 1/161* (2013.01); *H04B 7/06* (2013.01); *H04B 7/0617* (2013.01)

(58) Field of Classification Search
CPC ......... G08G 1/161; H04B 7/06; H04B 7/0617
See application file for complete search history.

(56) References Cited

U.S. PATENT DOCUMENTS

| 6,703,378 | B1 | 3/2004 | Kunzler et al. |
| 7,102,536 | B2* | 9/2006 | Scholz ................. G08G 1/0965 340/901 |
| 7,457,587 | B2* | 11/2008 | Chung .................. H01Q 1/241 343/702 |

(Continued)

FOREIGN PATENT DOCUMENTS

| CN | 103812542 A | 5/2014 |
| CN | 105992130 A | * 10/2016 .......... H04W 72/046 |

(Continued)

OTHER PUBLICATIONS

PCT/EP2016/051505, International Search Report dated Mar. 31, 2016 (Two (2) pages).

(Continued)

*Primary Examiner* — Eric Nowlin
(74) *Attorney, Agent, or Firm* — Crowell & Moring LLP

(57) ABSTRACT

The invention relates to a radio communication device for a vehicle, said device having at least one antenna unit, the emission of which can be controlled in one or more directions, and having a control unit coupled to the at least one antenna unit, for controlling the latter. The control unit is coupled to a control application and configured to control the at least one antenna unit in an application-controlled geo-beamforming operating mode, such that the emission of the at least one antenna unit is restricted to the course of the road in the current location of the vehicle.

10 Claims, 2 Drawing Sheets

(56) References Cited

U.S. PATENT DOCUMENTS

| | | | | |
|---|---|---|---|---|
| 8,032,134 B2* | 10/2011 | Tung | ............ | H04W 16/28 455/429 |
| 8,280,592 B2* | 10/2012 | Wisniowski | ............ | H01Q 3/26 701/49 |
| 8,311,482 B2* | 11/2012 | Jin | ............ | H04W 16/28 455/62 |
| 9,159,231 B2* | 10/2015 | Noh | ............ | G08G 1/096741 |
| 10,002,536 B2* | 6/2018 | Kim | ............ | G08G 1/005 |
| 10,049,587 B2* | 8/2018 | Kalathil | ............ | H04W 72/0466 |
| 10,178,531 B2* | 1/2019 | Nguyen | ............ | H04W 4/06 |
| 2003/0234720 A1* | 12/2003 | MacNeille | ............ | G08G 1/161 340/435 |
| 2008/0186206 A1* | 8/2008 | Reumerman | ............ | H04L 12/18 340/902 |
| 2008/0268865 A1* | 10/2008 | Tung | ............ | H04W 16/28 455/456.1 |
| 2009/0222173 A1* | 9/2009 | Wisniowski | ............ | H01Q 3/26 701/49 |
| 2009/0310608 A1* | 12/2009 | Chen | ............ | H04L 45/48 370/389 |
| 2010/0248672 A1* | 9/2010 | Orlik | ............ | H04B 7/0617 455/277.2 |
| 2010/0279616 A1* | 11/2010 | Jin | ............ | H04W 16/28 455/62 |
| 2012/0077430 A1* | 3/2012 | Stuebing | ............ | H01Q 1/32 455/39 |
| 2015/0145695 A1* | 5/2015 | Hyde | ............ | G08G 1/166 340/905 |
| 2015/0170522 A1* | 6/2015 | Noh | ............ | G08G 1/096741 701/117 |
| 2016/0013545 A1* | 1/2016 | Hashimoto | ............ | H01Q 1/3283 343/713 |
| 2016/0112112 A1* | 4/2016 | Lee | ............ | H04B 7/0834 375/267 |
| 2016/0277911 A1* | 9/2016 | Kang | ............ | H04B 1/3822 |
| 2016/0278065 A1* | 9/2016 | Kim | ............ | H04W 72/046 |
| 2016/0278153 A1* | 9/2016 | Kim | ............ | H04W 4/023 |
| 2017/0018187 A1* | 1/2017 | Kim | ............ | H04L 67/12 |
| 2017/0299689 A1* | 10/2017 | Va | ............ | G01S 5/0226 |
| 2018/0005535 A1* | 1/2018 | Kalathil | ............ | H04B 1/3822 |
| 2018/0075746 A1* | 3/2018 | Jiang | ............ | G08G 1/096791 |
| 2018/0077518 A1* | 3/2018 | Nguyen | ............ | G08G 5/0008 |
| 2018/0128911 A1* | 5/2018 | Kim | ............ | G01S 13/931 |
| 2018/0199349 A1* | 7/2018 | Hehn | ............ | H04W 72/048 |
| 2018/0343605 A1* | 11/2018 | Wu | ............ | H04B 7/088 |
| 2019/0341812 A1* | 11/2019 | Arnstein | ............ | B64D 47/00 |

FOREIGN PATENT DOCUMENTS

| | | | | |
|---|---|---|---|---|
| CN | 105992134 A | * | 10/2016 | ............ H04W 4/023 |
| CN | 107111957 A | * | 8/2017 | ............ H04B 7/0617 |
| DE | 10 2005 053 510 A1 | | 5/2007 | |
| DE | 10 2009 011 276 A1 | | 9/2010 | |
| DE | 10 2013 207 094 A1 | | 10/2013 | |
| DE | 10 2013 006 087 A1 | | 1/2014 | |
| DE | 102015201641 A1 | * | 8/2016 | ............ H04B 7/0617 |
| DE | 102016204585 A1 | * | 9/2016 | ............ H04W 4/023 |
| KR | 20160112537 A | * | 9/2016 | ............ H04W 4/023 |
| KR | 20160112551 A | * | 9/2016 | ............ H04W 72/046 |
| WO | WO 2013/089731 A1 | | 6/2013 | |
| WO | WO-2014136658 A1 | * | 9/2014 | ............ B62J 99/00 |
| WO | WO-2016120236 A1 | * | 8/2016 | ............ H04B 7/06 |
| WO | WO-2018053355 A2 | * | 3/2018 | ............ G08G 1/096791 |
| WO | WO-2018108020 A1 | * | 6/2018 | |

OTHER PUBLICATIONS

German Search Report issued in German counterpart application No. 10 2015 201 641.2 dated Aug. 14, 2015, with Statement of Relevancy (Nine (9) pages).

* cited by examiner

APPLICATION-CONTROLLED GEO-BEAMFORMING

CROSS REFERENCE TO RELATED APPLICATIONS

This application is a continuation of PCT International Application No. PCT/EP2016/051505, filed Jan. 26, 2016, which claims priority under 35 U.S.C. § 119 from German Patent Application No. 10 2015 201 641.2, filed Jan. 30, 2015, the entire disclosures of which are herein expressly incorporated by reference.

BACKGROUND AND SUMMARY OF THE INVENTION

The invention generally relates to the field of car-to-X (C2X) communication. In particular, the invention relates to a radio communication device by means of which particular geographic areas can be supplied context-dependently and application-controlled with radio information independently of whether and how many receivers are located in these reception areas, particularly also independently of where exactly potential receivers are located in these areas.

Car-to-X (C2X) communication is the generic term for various communication techniques in automotive and traffic technology and relates to the exchange of information and data between motor vehicles and of motor vehicles with their environment, for example smartphones and/or other communication devices such as, for example, infrastructural components constructed on the roadside such as Roadside Units (RSU), Intelligent Roadside Stations (IRS) or mobile radio networks. Car-to-X communication thus comprises car-to-car (C2C) communication and car-to-infrastructure (C2I) communication. By means of C2X communication, a driver of a vehicle equipped with it can be informed early of critical and hazardous situations. A possible case of application is the detection and spreading of local hazard warnings. If, for example, a first vehicle stops just in front of an obstacle on a country road, following vehicles also approaching the hazard point can be informed about the hazard point by the first vehicle by means of C2X communication. A driver of a following vehicle can then be warned, for example, acoustically and/or optically of the situation and correspondingly reduce the speed of his vehicle in time. Thus, accidents can be avoided. To improve the C2X communication, it is already known to adapt the transmitting pattern of an antenna installation of the transmitting vehicle by means of so-called beamforming.

For example, DE 10 2009 011 276 A1 shows a communication system for vehicles having a communication module for data exchange of different types of messages with adjacent vehicles in the road traffic or with roadside electronic infrastructure facilities, an input unit for steering movements of the vehicle, an antenna installation having a number of antenna elements and a control device. The control device adapts radiation beams of the antenna installation in accordance with the type of message and/or the current steering movements of the vehicle so that its directions of propagation are directed to the course of the road and/or to infrastructure facilities mounted in the course of the road. With respect to other and similar systems, reference is also made to WO 2013/089731 A1, US 2010/0248672 A, U.S. Pat. Nos. 6,703,378 A and 7,457,587 A.

The known systems are not suitable for broadcasting, i.e. a point-to-multipoint communication, since information about a receiver must always be available or a possible receiver must first convey its site to the transmitter so that the radiation of the signal can be correspondingly adapted. In the known systems, the antenna installation of the vehicle is essentially optimized for an optimum point-to-point communication between a transmitter and a receiver by correspondingly adapting the radiation pattern of the antenna installation.

It is an object of the present invention to propose an improved C2X communication device for a vehicle by means of which the range of the information to be transmitted can be increased and/or the reliability of the communication and particularly the signal quality can be improved for a point-to-multipoint transmission.

The object is achieved by means of the respective features of the independent claims. Other exemplary embodiments and advantageous developments are obtained from the respective subclaims, the description and the drawings. In this context, features and details which are described in conjunction with the control device naturally also apply in conjunction with the corresponding methods, and vice versa in each case.

A core concept of the invention lies in adapting the radiation pattern of the at least one antenna unit to the course of the road present at the current location of the vehicle, i.e. restricting the radiation to relevant areas in which potential receivers could be located, in the sense of a point-to-area communication.

A first aspect of the invention relates to a radio communication device for a vehicle having: (i) at least one antenna unit, the radiation of which can be controlled in one or more directions and (ii) a control unit coupled with the at least one antenna unit, for controlling the at least one antenna unit. The control unit is coupled with a control application, particularly a control software module, and configured to control the at least one antenna unit in an application-controlled geo-beamforming operating mode in such a manner that the radiation of the at least one antenna unit is restricted to the course of the road present at the current location of the vehicle.

That is to say, the radio communication device is designed for a communication with wireless radio systems and has the capability for adapting the radiation pattern of the antenna architecture used (beamforming). By means of beamforming, the radiated RF power is focused only in relevant spatial directions. Relevant spatial directions can result from the arrangement of the traffic infrastructure (roads, buildings etc.) and of the vehicle relative thereto. Thus, the radiated transmission power can be focused with the at least one antenna unit onto these areas in which other traffic users can actually be located. As a result, the communication with other vehicles which are approaching the vehicle is improved.

The at least one antenna unit is preferably electrically adjustable for controlling the direction or directions of radiation. For this purpose, an antenna unit can have in each case an array of directional individual antennas which is physically configurable for controlling the direction of radiation of the antenna unit. For example, the RF energy radiated by the antenna unit can be focused in one or more preferred directions by means of a beamforming network (BFN) or an arrangement having corresponding phase shifters for phase matching the individual antennas and/or matching devices for the distance between the individual antennas and a device for selecting individual ones of the individual antennas and a matching device for the transmitting power of the individual antennas. That is to say, by means of beamforming, the radiation characteristics of the individual antennas are adjusted in such a manner that a desired directional pattern is produced for the totality of the electromagnetic waves radiated. Beamforming is reciprocal and can also be used correspondingly when receiving electromagnetic waves.

The control unit preferably has an interface for coupling with the control application. Via this interface, the control unit can be placed in the application-controlled geo-beamforming operating mode by the control application. That is to say, the radio communication device has an interface between the application level and the physical level via which control information can be exchanged for forming the radiation pattern in dependence on the state of the control application. By this means, the radiation pattern of the at least one antenna unit can be controlled by the application so that information can be propagated only in relevant directions and thus with extended range.

In principle, the control application can be a software program which runs on a driver information system (DIS, usually present in modern vehicles) as host system in the manner of a computer system. Additionally or alternatively, it is also possible that the control application runs completely or partially or cooperatively on a small computer carried by the driver of the vehicle such as, e.g., a smartphone or PDA. Such a small computer can be equipped for this purpose, for example, with near field radio technology such as WLAN, ZigBee, Bluetooth or the like in order to be directly coupled with the control unit in the vehicle cooperatively or coupled with the control application in the driver information system as host system; this results in particular possibilities of application still to be explained below.

The control application is preferably configured to determine the geographic position (location) and situation (alignment) of the vehicle in which the radio communication device is located as transmitting subscriber and to determine context-dependently an area of relevance for the "point-to-area" communication for information to be transmitted relative to the transmitting subscriber. The radio communication device according to the invention can thus be optimized for the transmission of information into a particular region or a particular direction in which this information could be relevant. That is to say there is no optimization of a communication between the vehicle and a single particular other subscriber, but rather an optimization of the range and signal quality for the relevant area or areas (areas of relevance). In other words, the RF radiation of the at least one antenna unit can be restricted to the course of the road present at the current location of the vehicle so that a radiation to the traffic infrastructure present at the current location takes place with consideration of the arrangement/alignment of the vehicle relative thereto, i.e. only in relevant spatial directions.

The control application can be configured to detect a situation in which information is to be transmitted to other traffic users. For example, the control application can be configured to detect a hazard situation and to send a corresponding local hazard warning to other traffic users. In this context, it can be, for example, a warning of a ghost driver, black ice, aquaplaning or a construction site or the like. To recognize a hazard situation, the application can collect and evaluate data available in the vehicle such as response or activation of ABS, the steering angle, the position, the direction and the speed of the vehicle in order to recognize a hazard situation. Based on this information, the control application communicates via the interface with the physical level, i.e. the radio communication device for transmitting the control information for context-dependent forming of the radiation pattern (beamforming) of the antenna architecture (application-controlled geo-beamforming operating mode). The local hazard warning can then be handed on by means of the radio communication device in the form of radio messages as C2X communication to other traffic users/vehicles.

An application-controlled geo-beamforming operating mode of the antenna units according to the invention improves the range and/or the transmission quality of the radio communication device.

The control application can be additionally configured to be selective also in the respective areas of relevance in that the at least one antenna unit is controlled in the application-controlled geo-beamforming operating mode in such a manner that information is radiated only in a relevant direction of travel. For example, information is radiated only in the direction of the opposite traffic in the case of one road.

The radio communication device can be designed in such a manner that, for example, emergency braking actions, ice and aquaplaning or the presence of emergency vehicles with blue light, accidents or construction sites are reported to all following vehicles within 1 km.

Alternatively or preferably, the control application can be additionally configured so that a user can trigger a transmission of information independently in or by means of the control application. A possible case of application for this is a type of digital safety vest for a driver of a car. For example, a driver can be standing at the edge of a freeway or country road due to a breakdown of his vehicle or of another vehicle. The driver can then trigger the broadcasting of his position, location and situation to other traffic users in the form of a local hazard warning by means of a suitable terminal, e.g. his smartphone on which one of the control applications described above is running which is coupled to the control unit or a corresponding host application in the vehicle, or at the host application. The radio communication device thus acts virtually as a "digital safety vest". The control application being used here can take into consideration the position and location of the driver relative to the road and/or to the vehicle. The driver standing on a freeway or country road can thus signal his current position to all approaching vehicles by means of his smartphone. By this means, it is possible, e.g. to signal a warning "pedestrian on the freeway" to other drivers so that these can react appropriately and in time, for example with a reduction of the speed or a change in traffic lane. In a special embodiment, the control unit can be configured in that the application-controlled geo-beamforming operating mode of the antenna unit according to the invention is designed in such a manner that only vehicles in a relevant direction of travel can receive the warning signal. This is appropriate, for example, when the opposite traffic does not represent a hazard for a vehicle which has stopped or is located at the roadside due to a limitation of the means. In this case, the control application can control the antenna device in such a way that the information is only radiated in opposition to the current direction of travel in the area of the current traffic lane.

The location determining unit and the digital map unit can be part of a navigation system located in the vehicle. The navigation system can be permanently integrated into the vehicle or be a mobile navigation system which, for example, is located on a smartphone. The digital map unit can also be a database which can be accessed via the Internet via a data radio link. The location determining unit can be a GPS module which is located in the driver information system or the smartphone.

A second aspect of the invention relates to a vehicle having one of the radio communication devices described above.

A third aspect relates to a method for controlling an antenna unit in a vehicle in such a manner that the antenna unit only radiates in one or more particular directions of radiation. The method has preferably the steps: (a) determining the current location at which the vehicle is located; (b) determining, based on the current location, by means of a digital map, in which directions the road or roads extend starting from the current location; and (c) controlling the antenna unit in such a manner that its radiation is aligned with the course of the road present at the current location of the vehicle.

Naturally, the method described here can be designed in accordance with the embodiments of the radio communication device described above.

By means of the present invention, both the range of the information to be transmitted can be increased and correspondingly the signal quality of the radio signal received at potential receivers can be improved. This is due to the concentration of the transmitting power onto the relevant transmitting areas. Depending on the case of application, the electronic "visual range" of the drivers of other vehicles which are also equipped with C2X communication means is virtually extended with electronic means. Since other traffic users (which are relevant for the corresponding information) can thus be warned earlier of a particular situation by means of the extended range and the improved signal quality, accidents can be avoided and generally the safety in road traffic increased. Depending on context, certain areas can thus be supplied with information independently of whether and how many receivers are located in these receiving areas and also independently of where exactly the potential receivers are located in this area of reception.

Further advantages, features and details of the invention are obtained from the subsequent description in which an exemplary embodiment of the invention is described in detail with reference to the drawings. In this context, the features mentioned in the claims and in the description can be in each case essential to the invention individually per se or in any combination. Similarly, the features mentioned above and explained further here can be used in each case by themselves or in numbers in arbitrary combinations. Functionally similar or identical components are partially provided with the same reference symbols. The terms "left", "right", "top" and "bottom" used in the description of the exemplary embodiments relate to the drawings in one alignment with normally readable figure designation or normally readable reference symbols, respectively. The embodiment shown and described should not be considered to be conclusive but has an exemplary character for explaining the invention. The detailed description is used for informing the person skilled in the art which is why known circuits, structures and methods are not shown or explained in detail in the description in order not to impede understanding.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
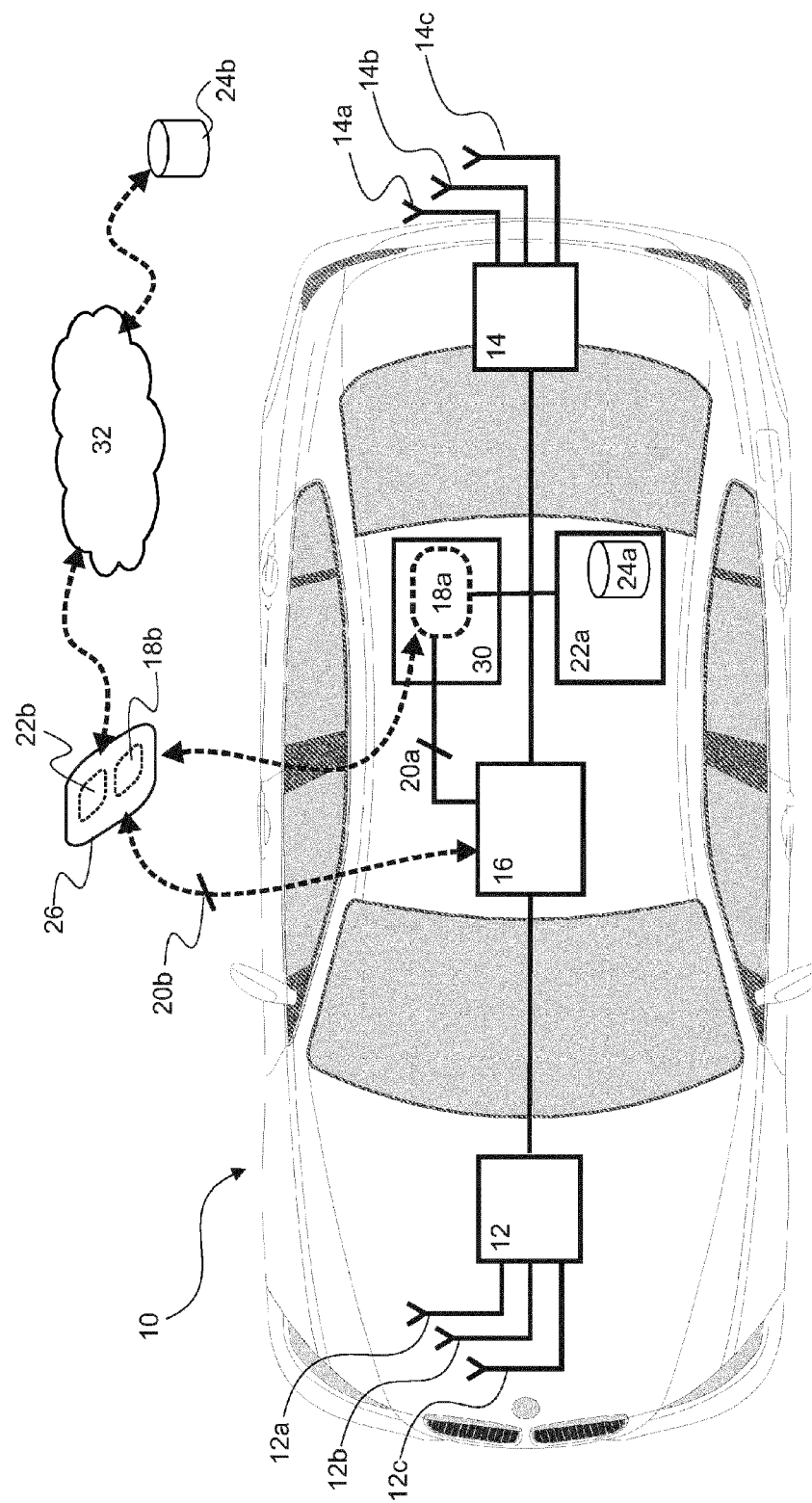
FIG. 1 shows a block diagram of a vehicle with an exemplary embodiment for a radio communication device according to the invention.

FIG. 1 shows a block diagram of a vehicle 1 with an exemplary embodiment of a radio communication device according to the invention. The radio communication device of the vehicle 10 shown has two antenna units 12 and 14, the radiation of which can be controlled into one or a number of directions. For this purpose, the antenna units 12, 14 are coupled to a control unit 16 for controlling the radiation pattern of the antenna units 12, 14.

The control unit 16 is coupled with a control application 18a and/or 18b which is configured to control the antenna units 12, 14 in an application-controlled geo-beamforming operating mode in such a manner that the radiation of the antenna units 12, 14 is restricted to the course of the road present at the current location of the vehicle 10. By focusing the radiated transmission power onto such areas (roads) in which other traffic users can be actually located, the communication with other vehicles which are approaching vehicle 10 is distinctly improved.

For focusing the radiated transmission power in one or more directions of radiation, the antenna units 12, 14 are electrically adjustable. For this purpose, the antenna units 12, 14 consist in each case of an array with directional individual antennas 12a, 12b, 12c and 14a, 14b, 14c, respectively. To adjust the direction of radiation, the antenna units 12, 14 are physically configurable. In the example shown in FIG. 1, the control unit 16 is configured to control phase shifters arranged in the respective antenna unit for phase matching the transmission signal of the respective individual antennas 12a, 12b, 12c and 14a, 14b, 14c, respectively, respective matching devices for the distance between the individual antennas 12a, 12b, 12c and 14a, 14b, 14c, respectively, a device for selecting individual ones of the individual antennas 12a, 12b, 12c and 14a, 14b, 14c, respectively, and a matching device for the transmitting power of the individual single antennas 12a, 12b, 12c and 14a, 14b, 14c, respectively. The radiation characteristics of the individual antennas 12a, 12b, 12c and 14a, 14b, 14c, respectively, can be adjusted for beamforming in such a way that a desired directional pattern is obtained for the totality of the radiated electromagnetic waves (compare example in FIG. 2). Beamforming is reciprocal, i.e. the reception characteristic of the radio communication device of the vehicle 10 thus improves in the same way.

The control unit 16 has an interface 20a for coupling with the control application 18a. Via the interface 18a, the control unit 16 can be placed context-dependently in the application-controlled geo-beamforming operating mode by the respective control application 18a.

So that the control unit 16 can correctly control the radiation pattern of the respective antenna unit 12, 14, the control application 18a is coupled with a determining unit 22a for the current location and the alignment of the vehicle 10 and a digital map unit 24a. The control application 18a is implemented as a software module in a driver information system (DIS) 30 as host system of the vehicle 10 depending on the type of a computer system.

Furthermore, a further control application 18b runs on a smartphone 26 carried along by the driver of the vehicle in the exemplary embodiment of FIG. 1. The smartphone 26 is coupled to the control application 18a in DIS 30 of vehicle 10 as host application via near-field radio technology such as, e.g., WLAN, ZigBee, Bluetooth or the like. This results in the possible applications discussed in the text which follows.

The control application 18a is configured to determine the geographic position (location) and situation (alignment) of the vehicle 10 with the radio communication device so that one or more areas of relevance can be determined context-dependently for "point-to-area" communication of information to be transmitted relative to the vehicle 10. On the basis of this information about current location and alignment of the vehicle 10, the control application 18a communicates via the interface 20a with the physical level, i.e. the radio communication device, in order to transmit control information for context-dependent forming of the radiation pattern of the antenna architecture (application-controlled geo-beamforming operating mode).

Firstly, it is a basic principle of the improvement proposed here to restrict the radiation of the antenna units 12, 14 to the course of the road present at the current location of the vehicle 10. That is to say, radiation should take place only in relevant spatial directions (compare 26a, 26b, 26c, 26d of FIG. 2) based on the traffic infrastructure present at the current location and/or the arrangement of vehicle 10 relative thereto.

The control applications 18a or 18b can be basically configured so that the antenna units 12, 14 are controlled in the application-controlled geo-beamforming operating mode in such a manner that information is only radiated in the direction of the opposite traffic or alternatively in the direction of the following traffic. The control unit 16 can also be configured so that, e.g. in the case of a freeway, the application-controlled geo-beamforming operating mode of the antenna units 12, 14 is designed in such a way that radiation takes place in such a way that only vehicles in the direction of travel affected can receive the local hazard warning.

With regard to the context-dependence of the application-controlled geo-beamforming operating mode, the following should be noted. The control applications 18a, 18b are configured to detect a situation in which information (hazard message) is to be transmitted to other traffic users.

For example, the control application 18a can be configured to detect a hazard situation and correspondingly to send a local hazard warning to other traffic users. This can be, for example, a warning of a ghost driver, black ice, aquaplaning or a construction site or similar. To recognize such a hazard situation, the control application 18a is configured to collect and evaluate data present in the vehicle 10 such as response and activation of ABS, the steering angle, the position, the direction and the speed of the vehicle 10 in order to detect a hazard situation.

A local hazard warning can then be forwarded by means of the radio communication device in the form of radio messages, e.g. as C2X communication to other traffic users/vehicles. By means of the application-controlled geo-beamforming operating mode according to the invention of the antenna units 12, 14, the range and/or the transmission quality of the radio communication device is improved.

The control applications 18a and 18b are also configured so that a user can trigger a transmission of information independently in or by means of the control application 18a, 18b.

In a practical case of application, for example, the driver standing on the freeway or country road, e.g. in the case of a breakdown, can broadcast with his smartphone 26 with the control application 18b which is coupled to the control unit 16 or the control application 18a as host application in the vehicle 10, the broadcasting of his position, location and situation to other traffic users in the sense of a "digital safety vest". The control application 18b used in this process also determines the position and situation of the driver relative to the road and/or to the vehicle 10. For this purpose, for example, a GPS positioning module present in the smartphone is used. The driver standing on a freeway or country road can thus signal his position to all approaching vehicles by means of his smartphone 26. It is thus possible to signal a warning "pedestrian on the freeway" to other drivers. The drivers of the approaching vehicles can then take appropriate measures, for example reduce the speed in time or change the traffic lane.

In the embodiments described up to now, the entire control can be effected on the smartphone 26 via the control application 18b alone. For the purposes mentioned above, the smartphone 26 can be connected, via a data connection to the Internet 32, to a digital map 24b from a server which can be reached via the Internet.

The location determining unit 22a and the digital map unit 24a can be part of a navigation system located in the vehicle 10, the navigation system being permanently integrated into the vehicle 10.

During the operation of the radio communication device presented here, the respective control application 18a or 18b or the two control applications 18a and 18b, respectively, jointly carry out the following method for controlling the antenna units 12 and 14 in the vehicle 10 so that the antenna units 12 and 14 only radiate in one or more particular directions of radiation. In this context, the current location at which the vehicle 10 is located is firstly determined. Based on the current location, it is then determined by means of the digital map 24b in which direction(s), starting from the current location, the road or roads run. In accordance with these geographic data determined, the antenna units 12 and 14 are controlled in such a manner that their radiation is directed onto the course of the road present at the current location of the vehicle 10.

Figure 2:
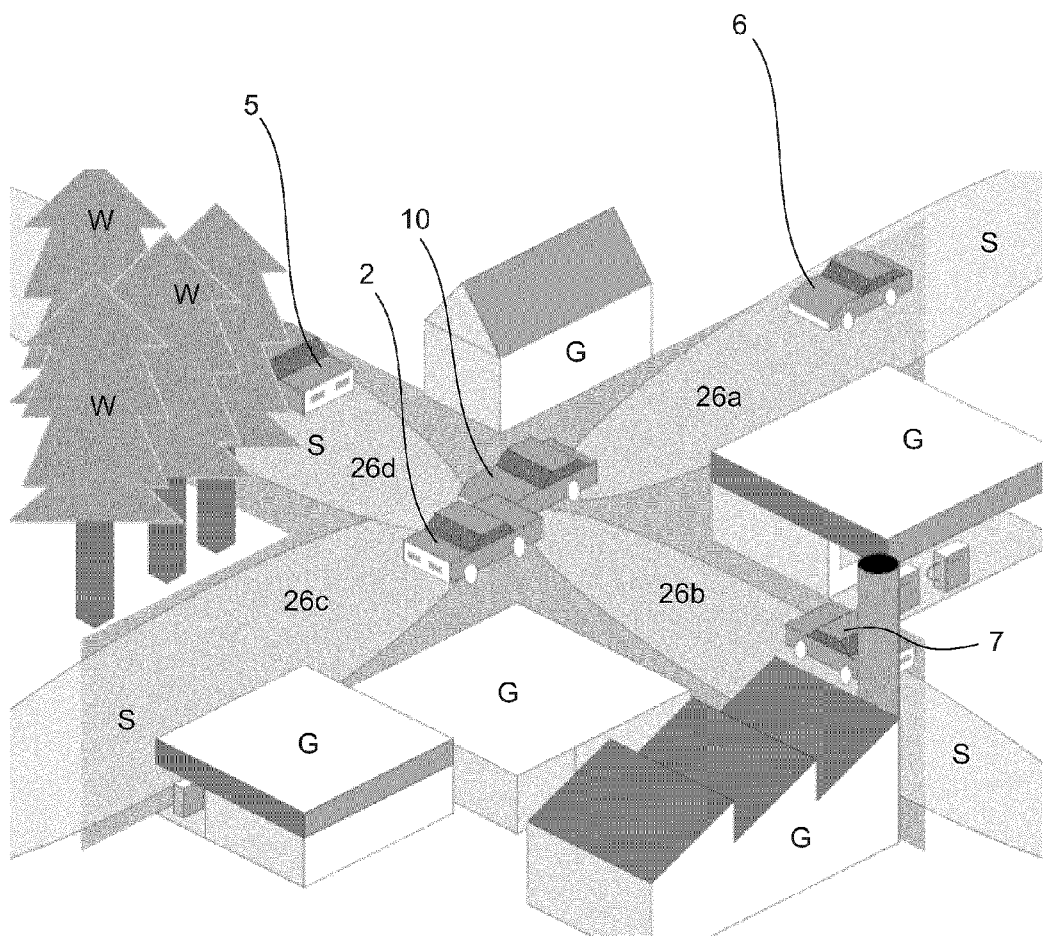
FIG. 2 illustrates a possible exemplary application for the application-controlled geo-beamforming operating mode according to the invention of an antenna unit of a vehicle which is involved in an accident on a road intersection.

FIG. 2 illustrates a possible exemplary embodiment for the application-controlled geo-beamforming operating mode according to the invention of the antenna units 12 and 14 of the vehicle 10.

The vehicle 10 has been involved in an accident with another vehicle 2 at a road intersection. Relevant areas for the information "accident ahead" are only the respective traffic lanes which lead to the accident site, on which other vehicles 5, 6, 7 can approach the accident location. This information does not need to be transmitted in built-up areas G, woods W, etc. since it is improbable that another vehicle will approach from there.

Correspondingly, the antenna units 12 and 14 of the vehicle 10 are controlled in such a way that radiation takes place only in directions 26a, 26b, 26c, 26d, i.e. along the roads S running towards the intersection, in order to warn approaching vehicles 5, 6, 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A radio communication device for a vehicle comprising:
   at least one antenna unit, of which point-to-area radiation can be controlled in one or more directions; and
   a control unit coupled with the at least one antenna unit, wherein the control unit:
      controls the at least one antenna unit, the control unit being coupled with a control application that detects a situation, in response to which a message is transmitted,
      receives, from a location determining unit in the vehicle, directions of one or more roads extending from a current location of the vehicle, and
      controls, in response to receiving the directions of the one or more roads extending from the current location of the vehicle, the at least one antenna unit in an application-controlled geo-beamforming operating mode such that the point-to-area radiation of the at least one antenna unit is restricted to a course of the one or more roads extending from the current location of the vehicle, wherein the point-to-area radiation is restricted to the course based on a relevance of an area where other traffic users could be located.

2. The radio communication device as claimed in claim 1, wherein the control unit further comprises an interface coupling the control unit to the control application via which the control unit is placed in the application-controlled geo-beamforming operating mode by the control application.

3. The radio communication device as claimed in claim 1, wherein the control application is coupled with a vehicle location determining unit and a digital map unit.

4. The radio communication device as claimed in claim 1, wherein the radiation of the at least one antenna unit is restricted to the course of the road present at the current location of the vehicle such that the radiation from the at least one antenna unit takes place only in relevant spatial directions based on a traffic infrastructure present at the current location and/or current arrangement of the vehicle relative to the traffic infrastructure.

5. The radio communication device as claimed in claim 4, wherein the control application controls the at least one antenna unit in the application-controlled geo-beamforming operating mode such that information is radiated only in a relevant direction of travel.

6. The radio communication device as claimed in claim 1, wherein the vehicle location determining unit and the digital map unit comprise a navigation system located in the vehicle.

7. A vehicle having a radio communication device, wherein the radio communication device comprises:
   at least one antenna unit, of which point-to-area radiation can be controlled in one or more directions;
   a location determining unit; and
   a control unit coupled with the at least one antenna unit and with the location determining unit, wherein the control unit:
      controls the at least one antenna unit, the control unit being coupled with a control application that detects a hazard situation, in response to which a message is transmitted,
      receives, from the location determining unit, directions of one or more roads extending from a current location of the vehicle, and
      controls, in response to receiving the directions of the one or more roads extending from the current location of the vehicle, the at least one antenna unit in an application-controlled geo-beamforming operating mode such that the point-to-area radiation of the at least one antenna unit is restricted to a course of the one or more roads extending from the current location of the vehicle, wherein the point-to-area radiation is restricted to the course based on a relevance of an area where other traffic users could be located.

8. A method for controlling an antenna unit in a vehicle such that the antenna unit only point-to-area radiates in one or more particular directions of radiation, the method comprising:
   determining a current location at which the vehicle is located;
   determining, based on the current location, by means of a digital map, in which directions one or more roads extend starting from the current location; and
   controlling, in response to determining directions of the one or more roads extending from the current location of the vehicle, the antenna unit such that its point-to-area radiation is aligned with a course of the one or more roads extending from the current location of the vehicle, wherein the point-to-area radiation is restricted to the course of the one or more roads based on a relevance of an area where other traffic users could be located in response to a detected situation.

9. The method as claimed in claim 8, further comprising restricting radiation of the antenna unit to the course of the one or more roads extending from the current location of the vehicle such that radiation from the antenna unit takes place only in relevant spatial directions based on a traffic infrastructure present at the current location and/or current arrangement of the vehicle relative to the traffic infrastructure.

10. The method as claimed in claim 9, further comprising controlling the antenna unit in an application-controlled geo-beamforming operating mode such that information is radiated only in a relevant direction of travel.

* * * * *